US011939155B2

(12) United States Patent
Mortenson et al.

(10) Patent No.: US 11,939,155 B2
(45) Date of Patent: Mar. 26, 2024

(54) ADJUSTABLE TIPPING DEVICE FOR A REFUSE VEHICLE

(71) Applicant: Oshkosh Corporation, Oshkosh, WI (US)

(72) Inventors: Matthew Mortenson, Oshkosh, WI (US); Varun Kandasamy, Oshkosh, WI (US); Kirby Sorensen, Oshkosh, WI (US); Clinton T. Weckwerth, Pine Island, MN (US); Zachary L. Klein, Rochester, MN (US); Jerrod Kappers, Oshkosh, WI (US); Nicholas Malm, Oshkosh, WI (US); Jerry Shirley, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 32 days.

(21) Appl. No.: 17/533,686

(22) Filed: Nov. 23, 2021

(65) Prior Publication Data
US 2022/0161997 A1    May 26, 2022

Related U.S. Application Data

(60) Provisional application No. 63/117,541, filed on Nov. 24, 2020.

(51) Int. Cl.
*B65F 3/02*    (2006.01)
*B65F 3/04*    (2006.01)
*F16M 11/04*   (2006.01)

(52) U.S. Cl.
CPC ............ *B65F 3/0213* (2013.01); *B65F 3/046* (2013.01); *F16M 11/045* (2013.01);
(Continued)

(58) Field of Classification Search
CPC ........ B65F 3/0213; B65F 3/041; B65F 3/046; B65F 2003/024; B65F 2003/0246; B65F 2003/0263; F16M 11/045; F16M 11/046
(Continued)

(56) References Cited

U.S. PATENT DOCUMENTS 2,733,786 A * 2/1956 Drake ....................... E04C 3/09
403/4
4,035,093 A * 7/1977 Redshaw .............. F16B 5/0225
403/4
(Continued)

FOREIGN PATENT DOCUMENTS

| CN | 107237962 A | * | 10/2017 | ........... F16M 11/045 |
| EP | 690014 A1 | * | 1/1996 | ............ B65F 3/0213 |
| GB | 2404178 A | * | 1/2005 | .............. B60P 1/483 |

*Primary Examiner* — James Keenan
(74) *Attorney, Agent, or Firm* — Foley & Lardner LLP

(57) ABSTRACT

A refuse container tipping device includes a first mounting plate, a second mounting plate, a hinge plate, and a plurality of fasteners. The first mounting plate defines a plurality of first slots. The plurality of first slots each extend in a first direction along substantially parallel axes. The second mounting plate is releasably coupled to the first mounting plate and defines a plurality of second slots. The plurality of second slots each extend in a second direction along substantially parallel axes. The first direction is perpendicular to the second direction. The hinge plate is coupled to the second mounting plate. The hinge plate supports a hinge and a grapple arm that is rotatably coupled to the hinge. The plurality of fasteners couple the second mounting plate to the first mounting plate by extending through the plurality of first slots and the plurality of second slots.

18 Claims, 11 Drawing Sheets

(52) U.S. Cl.
 CPC ...... *F16M 11/046* (2013.01); *B65F 2003/023* (2013.01); *B65F 2003/0263* (2013.01); *B65F 2003/0296* (2013.01)

(58) Field of Classification Search
 USPC .......................... 248/223.21, 297.21, 298.1
 See application file for complete search history.

(56) References Cited

U.S. PATENT DOCUMENTS

| | | | | |
|---|---|---|---|---|
| 4,307,865 | A | * | 12/1981 | MacCready ............. B60N 2/38 248/424 |
| 4,673,327 | A | * | 6/1987 | Knapp .................... B65F 1/122 414/408 |
| 10,767,807 | B2 | * | 9/2020 | Kulesia, II ............. F16M 11/42 |
| 2005/0205728 | A1 | * | 9/2005 | Avery .................. F16M 11/045 248/316.1 |
| 2020/0016446 | A1 | * | 1/2020 | Speckmaier ........... A47F 5/0846 |
| 2020/0198888 | A1 | * | 6/2020 | Steimel .................... B66D 1/60 |
| 2022/0219895 | A1 | * | 7/2022 | McNeilus ................. B65F 3/04 |

* cited by examiner

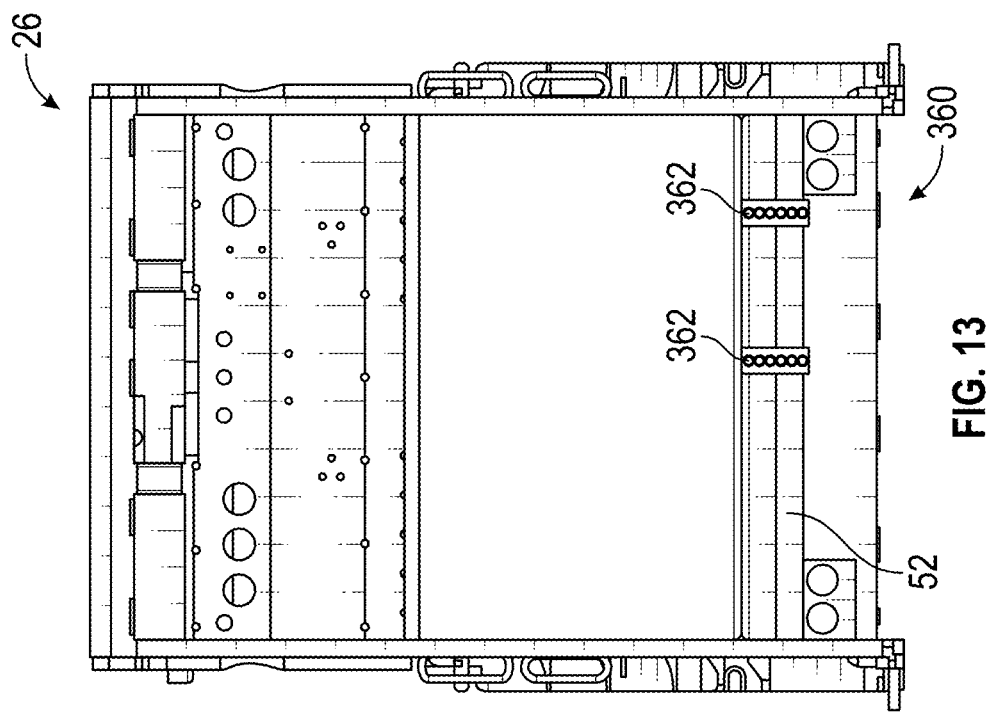
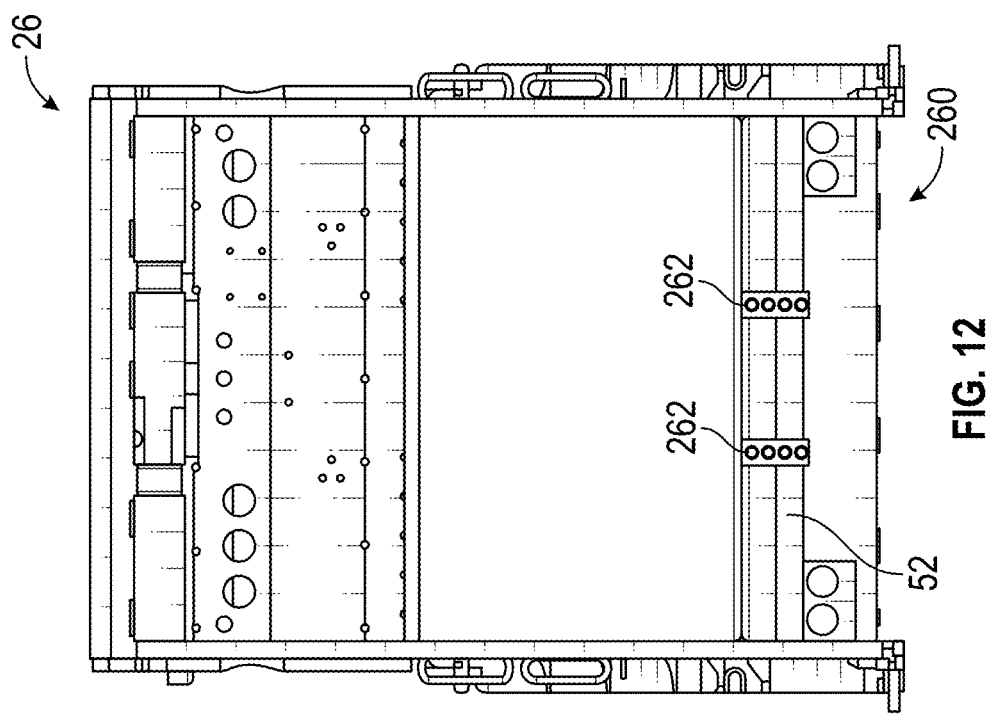

ADJUSTABLE TIPPING DEVICE FOR A REFUSE VEHICLE

CROSS-REFERENCE TO RELATED APPLICATION

This application claims priority to U.S. Provisional Patent Application No. 63/117,541, filed Nov. 24, 2020, the content of which is hereby incorporated by reference in its entirety.

BACKGROUND

Refuse vehicles collect a wide variety of waste, trash, and other material from residences and businesses. Refuse vehicles generally include a lifting system that is movable to engage and lift a waste container so that the waste container's contents can be transferred into a receptacle onboard the refuse vehicle. In rear loading refuse vehicles, the lifting assembly includes a grappling arm that rotates upward and rearward about a hinge on the rear end of the refuse vehicle to lift and tip a waste container off the ground below. The lifting assembly can rotate the waste container so that the opening (e.g., a top of the waste receptacle) faces downward or substantially downward. Gravity urges refuse within the waste container to fall downward, out of the waste container and into the receptacle onboard the refuse vehicle. Once the waste container has been emptied, the lifting assembly can rotate the waste container backward and downward so that the waste container is returned to the ground below, in an upright position.

SUMMARY

One exemplary embodiment relates to a refuse container tipping device. The refuse container tipping device includes a first mounting plate, a second mounting plate, a hinge plate, and a plurality of fasteners. The first mounting plate defines a plurality of first slots. The plurality of first slots each extend in a first direction along substantially parallel axes. The second mounting plate is releasably coupled to the first mounting plate and defines a plurality of second slots. The plurality of second slots each extend in a second direction along substantially parallel axes. The first direction is perpendicular to the second direction. The hinge plate is coupled to the second mounting plate. The hinge plate supports a hinge and a grapple arm that is rotatably coupled to the hinge. The plurality of fasteners couple the second mounting plate to the first mounting plate. The plurality of fasteners include a bolt and a nut. The bolt extends into and through one of the plurality of first slots and one of the plurality of second slots. The nut is received on the bolt to selectively engage the second mounting plate onto the first mounting plate.

Another exemplary embodiment relates to a refuse container tipping device. The refuse container tipping device includes a hinge plate that rotatably supports a grapple arm. The hinge plate is coupled to a mounting plate assembly that is configured to be mounted on a tailgate of a refuse vehicle. The mounting plate assembly includes a pair of first mounting plates. The pair of first mounting plates defines at least a plurality of first slots and a plurality of second slots. The plurality of first slots and the plurality of second slots each define paths for slidable motion to adjust the hinge plate relative to the pair of first mounting plates using fasteners that extend through one of the first slots or the second slots.

Another exemplary embodiment relates to a refuse vehicle. The refuse vehicle includes a chassis supporting a plurality of wheels, a vehicle body supported by the chassis and defining a receptacle for storing refuse, a tailgate positioned at a rear end of the vehicle body and coupled to the receptacle, and a refuse container tipping device coupled to the tailgate. The refuse container tipping device includes a hinge plate that rotatably supports a grapple arm. The hinge plate is coupled to a mounting plate assembly. The mounting plate assembly includes a pair of first mounting plates. The pair of first mounting plates defines at least a plurality of first slots and a plurality of second slots. The plurality of first slots and the plurality of second slots each define paths for slidable motion to adjust the hinge plate relative to the pair of first mounting plates using fasteners that extend through one of the first slots or the second slots.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 12 is a rear view of the tailgate of FIG. 11, detailing another mounting plate assembly; and FIG. 13 is a rear view of another tailgate that can be included on the refuse vehicle of FIG. 1, according to still another embodiment.

DETAILED DESCRIPTION

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

Referring to the FIGURES generally, the various exemplary embodiments disclosed herein relate to systems, apparatuses, and methods for positioning and operating a waste container tipping device on a refuse vehicle. The waste container tipping device is adjustably mounted to a rear end of the refuse vehicle using mounting plates that define a series of slots. The mounting plates are slidably adjustable relative to one another and relative to the refuse vehicle using fasteners received within the slots. The slots extend in multiple axes (e.g., vertically and horizontally) so that the tipping device can be adjusted upwardly, downwardly, and laterally relative to the refuse vehicle. The adjustable nature of the tipping device allows workers of different heights to customize the refuse vehicle to best accommodate the completion of a refuse route, and further allows for a user to adjust the height of the tipping device to address changes in chassis height that may be caused by a tire size change or suspension lift. The tipping device of the present disclosure is also removable and replaceable, which improves the serviceability of the tipping device relative to conventional tipping devices.

Figure 1:
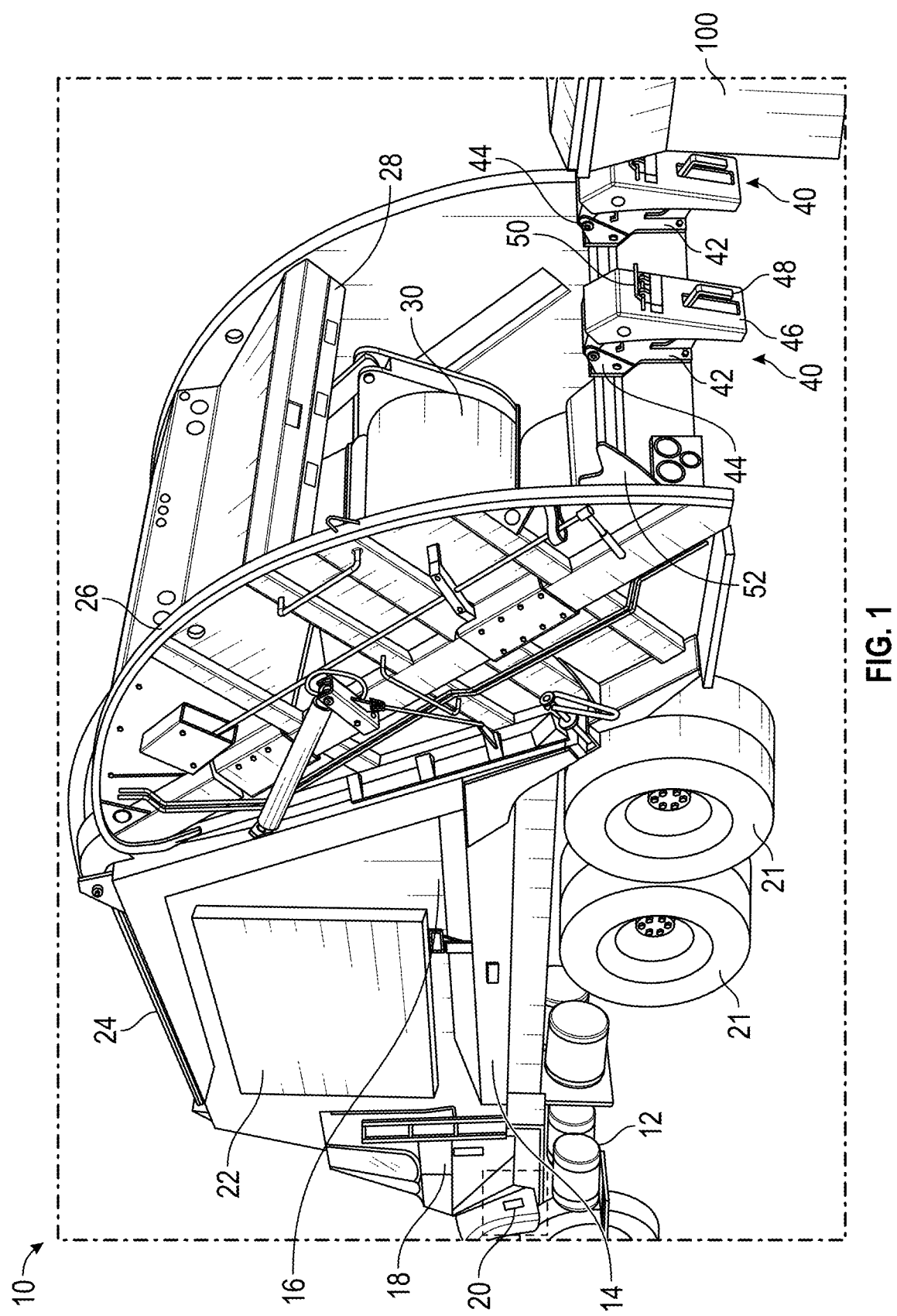
FIG. 1 is a rear perspective view of a refuse vehicle with a tipping device in a first position, according to an exemplary embodiment.
Figure 2:
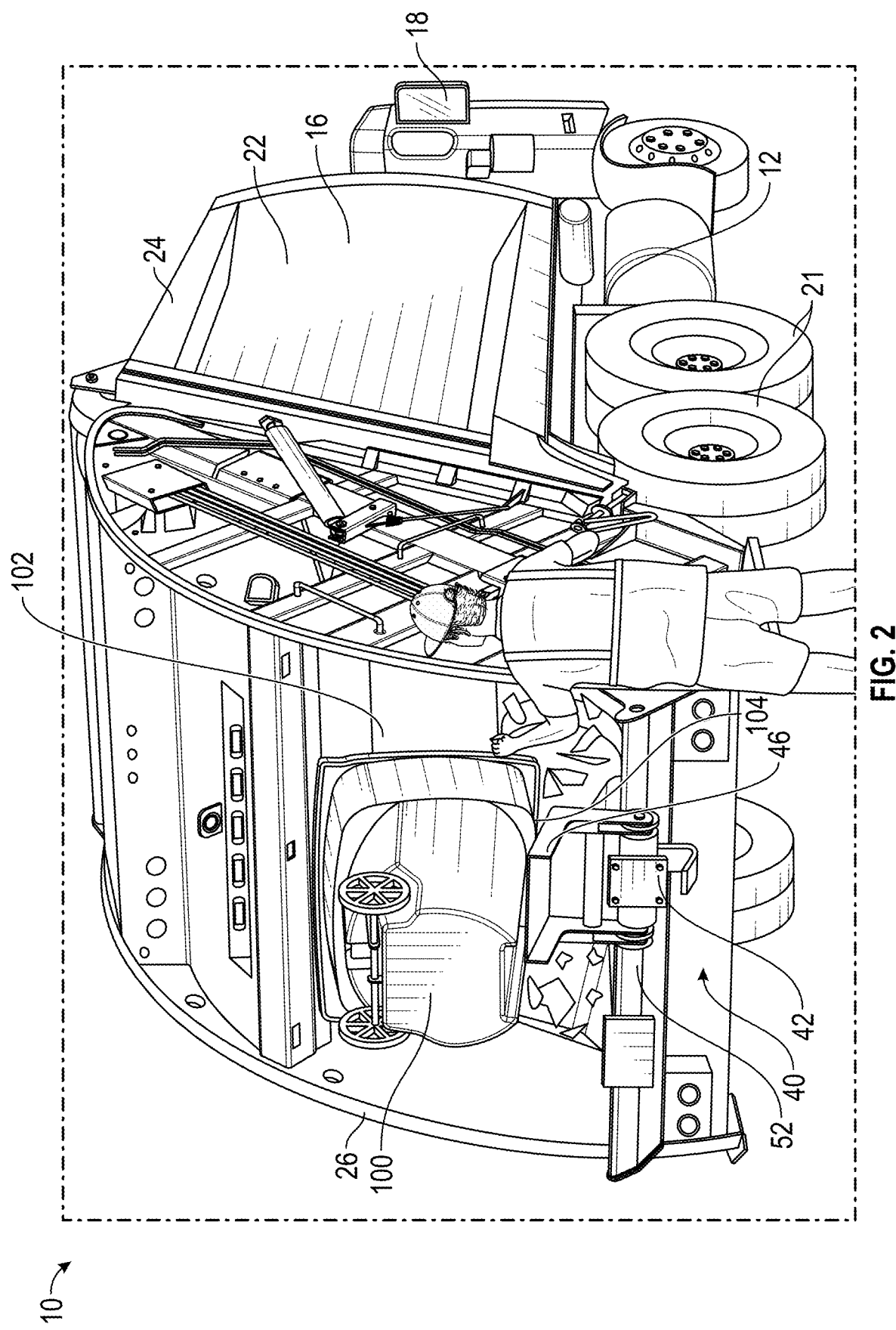
FIG. 2 is a rear perspective view of the refuse vehicle of FIG. 1, with the tipping device in a second position, according to an exemplary embodiment.
Figure 3:
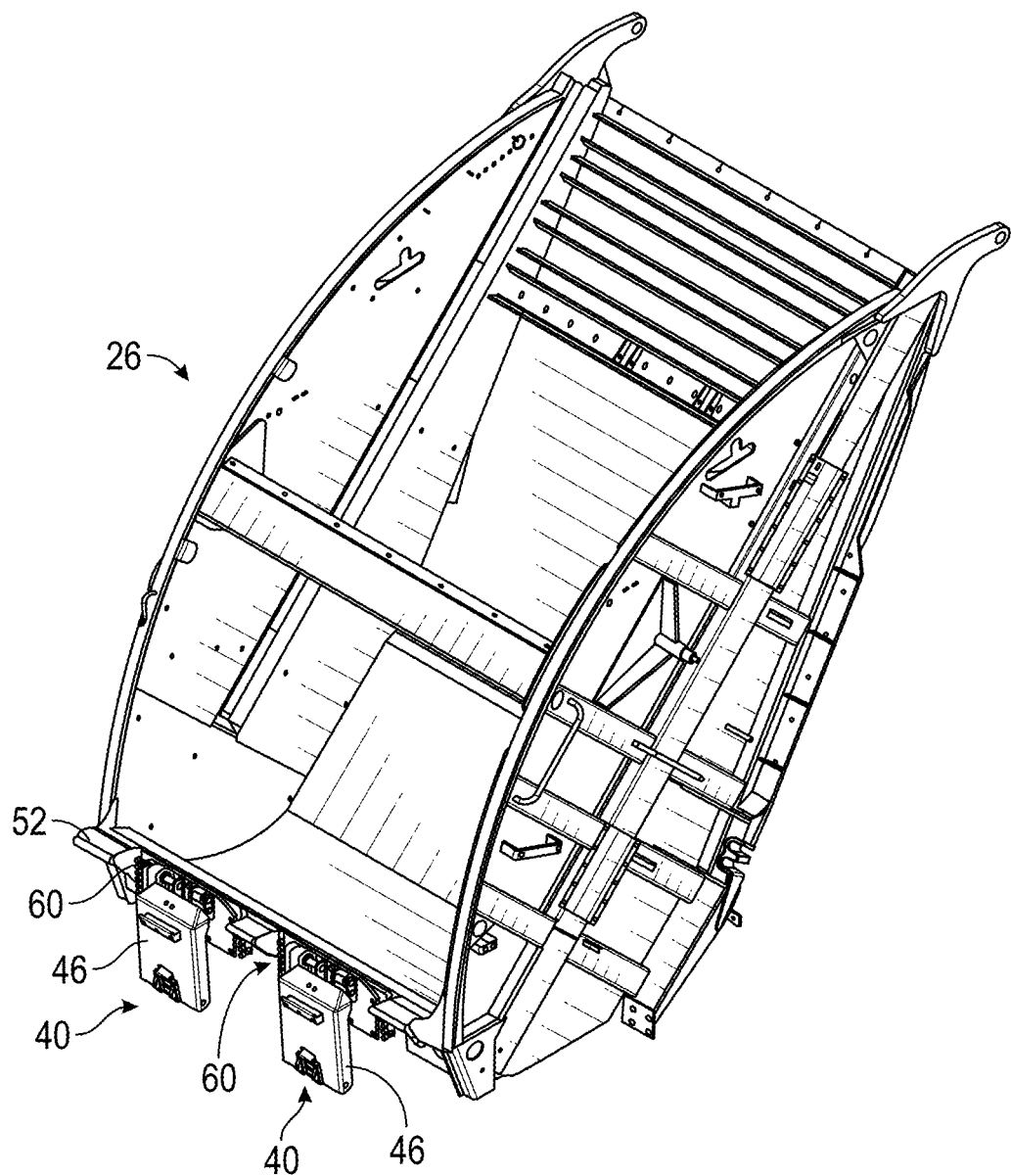
FIG. 3 is a rear perspective view of a tailgate that can be included on the refuse vehicle of FIG. 1.

As shown in FIGS. 1 and 2, a vehicle, shown as refuse truck 10 (e.g., a garbage truck, waste collection truck, sanitation truck, etc.), includes a chassis, shown as a frame 12, and a body assembly, shown as body 14, coupled to the frame 12. The body assembly 14 includes an on-board receptacle 16 and a cab 18. The cab 18 is coupled to a front end of the frame 12 and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). In some examples, the cab is configured for autonomous or semi-autonomous driving. The refuse truck 10 further includes a prime mover 20 coupled to the frame 12 at a position beneath the cab 18. The prime mover 20 provides power to a plurality of motive members, shown as wheels 21, and to a variety of other systems of the vehicle (e.g., a pneumatic system, a hydraulic system, a power take-off system, etc.). The prime mover 20 may be configured to use one or more of a variety of fuels (e.g., gasoline, diesel, bio-diesel, ethanol, natural gas, etc.), according to various exemplary embodiments. According to an alternative embodiment, the prime mover 20 is one or more electric motors coupled to the frame 12. The electric motors may consume electrical power from an on-board energy storage device (e.g., batteries, ultra-capacitors, etc.), from an on-board generator (e.g., an internal combustion engine and alternator), from an external power source (e.g., overhead power lines), or a combination of these power supplies to provide power to the systems of the refuse truck 10.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-2, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. According to the embodiment shown in FIGS. 1-2, the on-board receptacle 16 and collection chamber 28 are each positioned behind the cab 18. In the rear-loading refuse truck 10 shown in FIGS. 1-2, loose refuse is emptied into the tailgate 26. A packer 30 then scoops and pulls the loose refuse forward, out of the tailgate 26 and into the collection chamber 28 for storage and eventual compaction.

Referring to FIGS. 1-2, the refuse truck 10 is a rear-loading refuse vehicle. In operation, the rear-loading refuse vehicle approaches a pick-up site. With the refuse truck 10 parked, an operator can then position one or more waste containers 100 (often referred to as "toters") relative to a waste container tipping device 40 that is coupled to the tailgate 26, at the rear of the refuse truck 10. The waste container tipping device 40 includes a hydraulically-powered grapple arm 46 that is rotatably coupled to hinges 44 on a hinge plate 42. The grapple arm 46 includes one or more downward-facing hooks 48 and an upward-facing lip 50 that extend away from the grapple arm 46. The hooks 48 are arranged to engage a bar extending along a rear of the waste container 100 while the lip 50 engages a handle or ledge 104 formed near a lid of the waste container 100. By protruding from the grapple arm 46 in opposite directions (e.g., downward-facing hooks 48, upward-facing lip 50) to engage different portions of the waste container 100, the grapple arm 46 is able to securely and releasably couple with the waste container 100 regardless of orientation (e.g., the waste container 100 remains secured throughout the tipping process). In some examples, the downward-facing hooks 48 can slide relative to the grapple arm 46 to more securely engage the bar of the waste container 100, which in turn causes the lip 50 to more securely engage the handle or ledge 104 of the waste container 100.

With the hooks 48 and lip 50 engaged with different components of the waste container 100, the grapple arm 46 can swing upward and rearward relative to the hinge plate 42 about the hinges 44 to orient an opening 102 of the waste container 100 toward the tailgate 26. As shown in FIG. 2, the waste container 100 is at least partially inverted so that refuse within the waste container 100 is emptied from the waste container into the on-board receptacle 16. Aided by gravity and a sudden stop in momentum when the grapple arm 46 reaches its fully inverted position, refuse within the container 100 will fall through the opening 102 and into the tailgate 26 and on-board receptacle 16 below. Accordingly, the waste container tipping device 40 can transition between a fully stowed, or first position (shown in FIG. 1) and a fully deployed, or second position (shown in FIG. 2). Once the contents of the waste container 100 have been emptied, the waste container tipping device 40 rotates back to the first position, and the hooks 48 can translate upward relative to the grapple arm 46 to release the waste container 100 from the waste container tipping device 40. The grapple arm 46 is configured to rotate at least 90 degrees relative to the hinge plate 42. In some examples, the grapple arm 46 is configured to rate at least about 135 degrees relative to the hinge plate 42.

The waste container tipping device 40 can be provided with a variety of different motors or power sources to perform the engagement process (e.g., moving the hooks 48 downward) and the tipping process (e.g., rotating the grapple arm 46 about the hinge plate 42 to empty the waste container 100). In some examples, the grapple arm 46 is hydraulically driven, and provided with pressurized hydraulic fluid from a pump (not shown) onboard the refuse truck 10. In other examples, a winch system can be used to rotate the grapple arm 46 relative to the tailgate 26. In still further examples, one or more dedicated electric motors can be provided on the waste container tipping device 40. The dedicated electric motors can draw power from an alternator or from a battery onboard the refuse truck 10, for example.

With additional reference now to FIGS. 3-8, the waste container tipping device 40 is shown with a mounting plate assembly 60 that allows the waste container tipping device 40 to be adjustable in multiple directions relative to the tailgate 26. The mounting plate assembly 60 includes a series of mounting plates (e.g., mounting plates 62, 64, 66) that define a series of slots (e.g., slots 68, 70, 84, 86) that allow for sliding motion that can help reposition the hinge plate 42, hinge 44, and grapple arm 46 both vertically and laterally relative to the tailgate 26 of the refuse truck 10. The adjustable nature of the mounting plate assembly 60 can be helpful to accommodate different users or different types of waste containers 100 (e.g., different heights, styles, capacities, etc.). For example, the mounting plate assembly 60 can be readily adjusted based upon the type of route being completed by the refuse truck 10 (e.g., residential v. commercial, waste v. recycling, etc.) so that the waste container tipping device 40 is positioned at a suitable height and location to perform the desired refuse collection process. The adjustable nature of the mounting plate assembly 60 and the waste container tipping device 40, as a whole, allows the refuse truck 10 to interface with and empty waste containers 100 of different sizes without significant adjustment or labor from a user.

Figure 4:
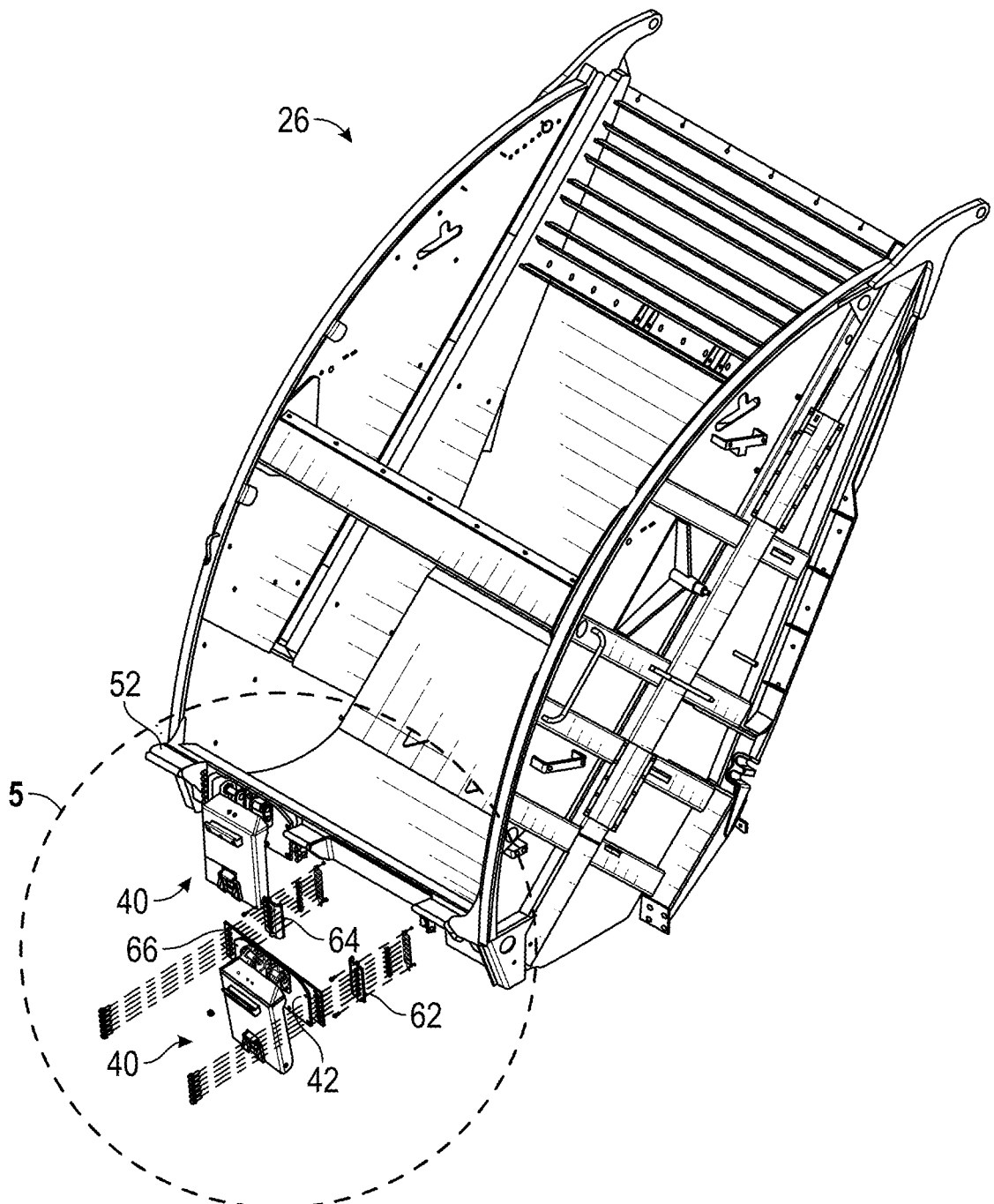
FIG. 4 is a partially exploded view of the tipping device on the tailgate of FIG. 3.
Figure 5:
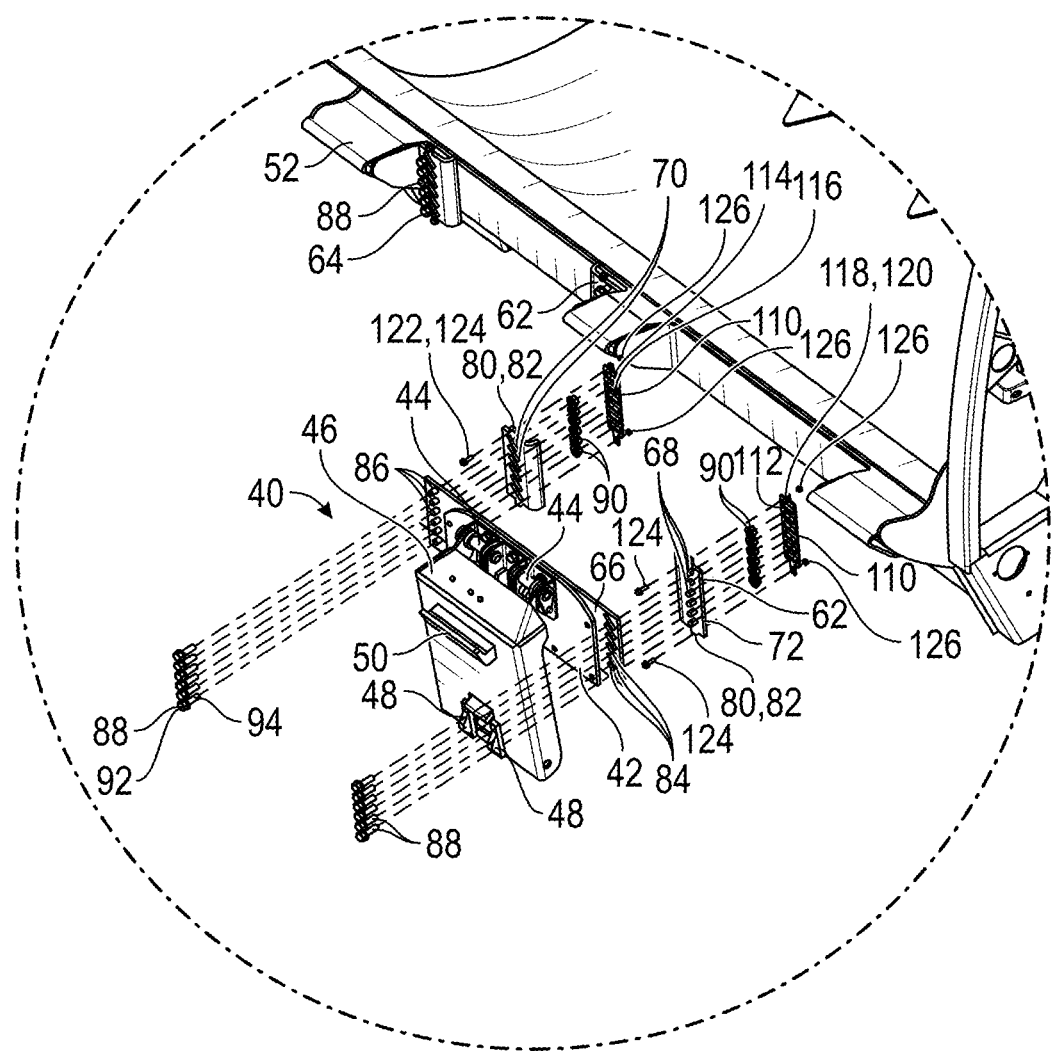
FIG. 5 is a detailed exploded view of the tipping device of FIG. 4.
Figure 6:
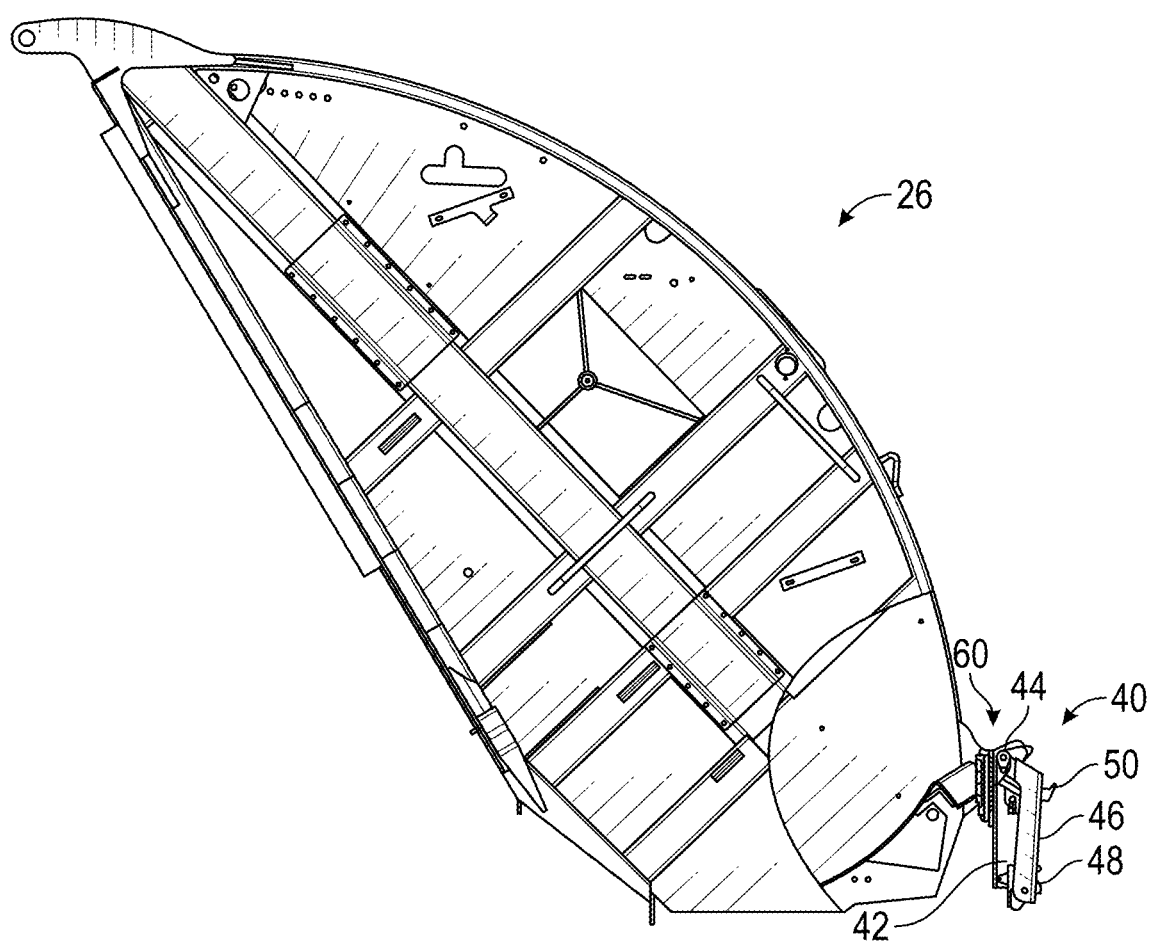
FIG. 6 is a side view of the tailgate of FIG. 3 and the tipping device of FIG. 4.
Figure 7:
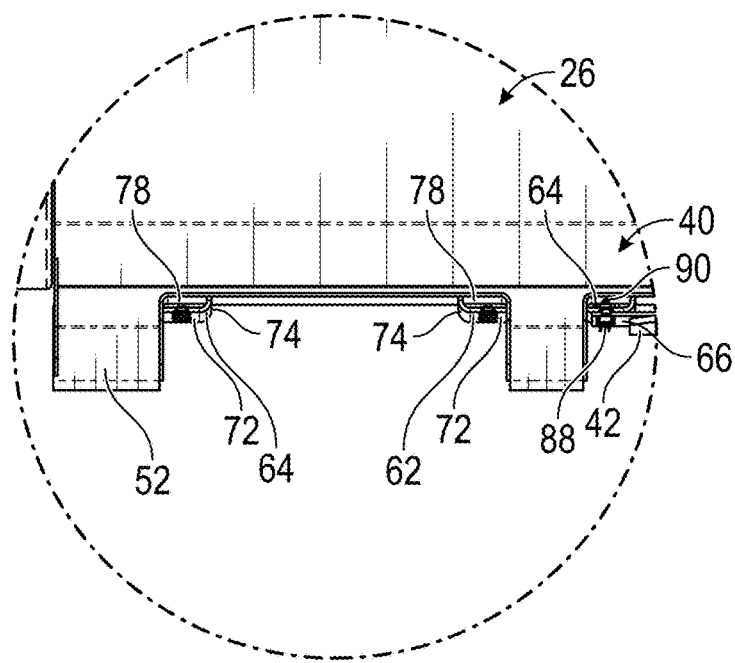
FIG. 7 is a top view of the tailgate of FIG. 3, with one of the tipping devices removed to detail a mounting plate assembly within the tipping device of FIG. 4.

With specific reference to FIGS. 4-5, the refuse truck 10 is shown with two separate waste container tipping devices 40 mounted to the tailgate 26 or rear fender 52 using mounting plate assemblies 60. The mounting plate assemblies 60 each include a pair of first mounting plates 62, 64. The first mounting plates 62, 64 can be directly coupled (e.g., bolted, welded, adhesively mounted) to the tailgate 26 or rear fender 52 of the refuse truck 10. The first mounting plates 62, 64 are generally defined by a flat mounting face 72 and a flange 74 extending rearwardly and approximately perpendicularly away from the mounting face 72. The L-shape of the first mounting plates 62, 64 created by the mounting face 72 and the flange 74 forms rectangular nut recesses 78 between the first mounting plates 62, 64 and the fender 52. As explained in additional detail below, the nut recess 78 creates space for positioning fasteners (e.g., nuts or bolts) relative to the first mounting plates 62, 64 to couple the waste container tipping device 40 to the refuse truck 10. In some examples, the first mounting plates 62, 64 are symmetrical to one another.

The first mounting plates 62, 64 define a series of first elongate slots 68, 70. The first elongate slots 68, 70 are formed entirely through and defined by the mounting face 72. The first slots 68, 70 have a generally elliptical shape and each extend diagonally (e.g., both horizontally and vertically) across a portion of the mounting face 72. As depicted in FIG. 5, the first slots 68, 70 are each spaced apart from one another and extend along parallel axes. In some examples, the first slots 68, 70 extend upwardly and outwardly away from the flanges 74 on the first mounting plates 62, 64. As depicted in FIG. 5, the first slots 68 extend approximately perpendicular to the first slots 70. In some examples, the mounting face 72 further includes tabs 80 with mounting apertures 82 that can be used in the assembly process, as explained in additional detail below.

The first mounting plates 62, 64 are configured to removably receive and support a second mounting plate 66. The second mounting plate 66 has a generally rectangular shape that spans between and can be coupled to each of the first mounting plates 62, 64 in the mounting plate assembly 60 simultaneously. Like the first mounting plates 62, 64, the second mounting plate 66 includes a plurality of second elongate, elliptically-shaped slots 84, 86 that are defined by and formed through the second mounting plate 66. The plurality of second slots 84, 86 extend diagonally within the second mounting plate 66 as well. In some examples, the plurality of second slots 84, 86 extend downwardly and outwardly toward a perimeter of the second mounting plate 66. As depicted in FIG. 5, the second slots 84 extend approximately perpendicular to the first slots 68, while the second slots 86 extend approximately perpendicular to the first slots 70. Accordingly, the second slots 84 extend approximately parallel to the first slots 70, while the second slots 86 extend approximately parallel to the first slots 68.

The second mounting plate 66 is removably coupled to the first mounting plates 62, 64 using fasteners, shown as bolts 88 and nuts 90. The bolts 88 include a widened head 92 and a shank 94. As depicted in FIGS. 4-5, the shank 94 of each bolt extends through one of the first slots 68, 70 and one of the second slots 84, 86. The head 92 of each bolt 88 is wider than the second slots 84, 86 so that when the bolts 88 are positioned within the mounting plate assembly 60, the head 92 of each bolt 88 will engage the second mounting plate 66 and will not pass through the second slots 84, 86. The shank 94 of each bolt is longer than a combined thickness of the second mounting plate 66 and the mounting face 72 of the first mounting plates 62, 64 so that a portion of each bolt 88 protrudes into the nut recesses 78. The threaded portions of each shank 94 extending into the nut recesses 78 can then receive one of the nuts 90. Torqueing the bolts 88 causes the shanks 94 to thread into the nuts 90, and brings the second mounting plate 66 into engagement with the first mounting plates 62, 64.

The shank 94 of each bolt 88 and the orientation of the slots 68, 70, 84, 86 allows the second mounting plate 66 to be both vertically and laterally adjustable relative to the first mounting plates 62, 64. When the bolts 88 and nuts 90 are not fully tightened, the shank 94 can traverse either of the first slots 68, 70 and second slots 84, 86, which allows the second mounting plate 66 to move relative to the refuse truck 10. Because the slots extend in perpendicular directions, the second mounting plate 66 can be adjusted in all four directions (e.g., upward, downward, right, left) relative to the first mounting plates 62, 64. Once the second mounting plate 66 is positioned at a desired location and orientation relative to the refuse truck 10 and relative to the first mounting plates 62, 64, the bolts 88 can be further torqued so that the second mounting plate 66 securely engages the mounting faces 72 of each of the first mounting plates 62, 64 to maintain the mounting plate assembly 60 in position. The length and shape of the slots 68, 70, 84, 86 defines the permissible movement between the second mounting plate 66 and the first mounting plates 62, 64, such that increasing the length of each slot 68, 70, 84, 86 could increase the degree of adjustability between parts in the adjustable mounting assembly 60. If further adjustment is needed or if the second mounting plate 66 is preferably removed, the bolts 88 can be loosened (or removed) from the nuts 90.

The adjustability of the second mounting plate 66 relative to the first mounting plates 62, 64 allows the entire waste container tipping device 40 to move relative to the refuse truck 10. As depicted in FIGS. 3-8, the hinge plate 42 is coupled to the second mounting plate 66. In some examples, the hinge plate 42 is directly coupled (e.g., welded or bolted) to the rear surface of the second mounting plate 66, so that movement of the second mounting plate 66 relative to the first mounting plates 62, 64 causes movement of the hinge plate 42, hinges 44, and grapple arm 46 relative to the refuse truck 10. In still other examples, the second mounting plate 66 is also the hinge plate 42, and directly supports the hinge 44 and grapple arm 46. The 360 degree adjustability both vertically and laterally relative to the refuse truck 10 allows a worker to easily position the waste container tipping device 40 in a desired and customized location along the refuse truck 10. The removable coupling formed between the second mounting plate 66 and the first mounting plates 62, 64 further allows the waste container tipping device 40 to be removed for maintenance, replacement, or storage.

In some examples, the mounting assembly 60 further includes a torque plate 110 to facilitate the coupling process between the bolts 88 and the nuts 90, which in turn facilitates engagement between the second mounting plate 66 and the first mounting plates 62, 64. Because there is limited space behind the first mounting plates 62, 64 when the first mounting plates 62, 64 are coupled to the rear fender 52 of the refuse truck 10, it may be difficult to properly position each of the nuts 90 relative to the first mounting plates 62, 64 before the nuts 90 are threaded to the bolts 88. The limited spacing between the first mounting plates 62, 64 and the refuse truck 10 can also inhibit tools from being positioned behind the first mounting plates 62, 64, making it difficult to tighten the nuts 90 to secure the second mounting plate 66 relative to the first mounting plates 62, 64. The torque plate 110 addresses this issue by providing a series of slots 112 that position and support the nuts 90 in uniformly spaced positions relative to the first mounting plates 62, 64. The uniformly spaced positions correspond with the distance between adjacent slots 68, 70, 84, 86 formed within the first mounting plates 62, 64 and second mounting plate 66, so that when the nuts 90 are received within one of the slots 112, the nuts 90 are also positioned in alignment with one of the first slots 68, 70 and one of the second slots 84, 86. The torque plate 110 holds the nuts 90 in a stationary position as the shanks 94 of the bolts 88 are threaded into the nuts 90 to form a coupling.

Figure 8:
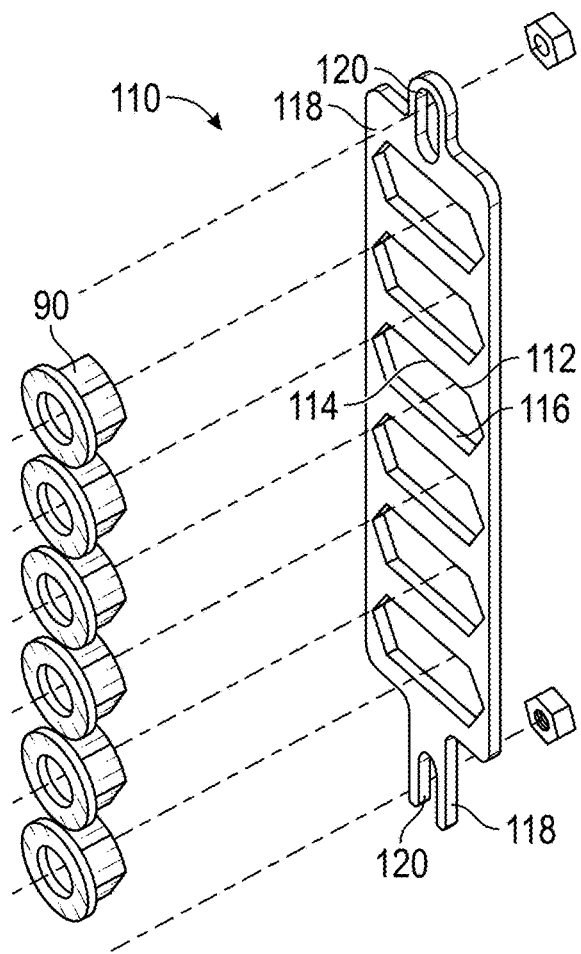
FIG. 8 is a perspective view of a torque plate that can be included within the tipping device of FIG. 4.

The slots 112 within the torque plate 110 are designed to receive the nuts 90 and prevent rotation of the nuts 90 to help facilitate the coupling process. As depicted in FIGS. 5 and 8, the hexagonally-shaped slots 112 (e.g., third slots) extend laterally along the torque plate 110, and generally include flat upper and lower surfaces 114, 116. The flat upper and lower surfaces 114, 116 of the slots 112 receive and secure opposite flats formed on the nuts 90. When the nuts 90 are received within the slots 112, the flat upper and lower surface 114, 116 interact with the flats formed on the nuts 90 to maintain the orientation of the nuts 90 when the bolts 88 are rotated (e.g., by preventing the nuts 90 from rotating). With rotation of the nuts 90 prevented, rotation of the bolts 88 relative to the nuts 90 will cause the bolts 88 to thread into the nuts 90. Accordingly, a user can tighten or loosen the coupling between the second mounting plate 66 and the first mounting plates 62, 64 using a single tool (e.g., a socket wrench, nut driver, etc.) rather than needing tools on both the bolt 88 and the nut 90 simultaneously to adjust the coupling.

The torque plate 110 can move vertically relative to the first mounting plates 62, 64 even when the torque plate 110 is fastened to the first mounting plates 62, 64. As depicted in FIGS. 5 and 8, the torque plate 110 includes locating tabs 118 and locating apertures 120 that are designed to align with the tabs 80 and mounting apertures 82 in the mounting face 72 of the first mounting plates 62, 64. Using a fastener assembly 122 (e.g., a bolt 124 and nut 126), torque plates 110 can be threadably coupled to the back side of both of the first mounting plates 62, 64. With a torque plate 110 coupled to each of the first mounting plates 62, 64, a nut 90 is aligned with each of the first slots 68, 70. The locating apertures 120 have an elongate shape which allows vertical adjustment of the torque plate 110 relative to the fastener assembly 122 and relative to the first mounting plates 62, 64. The elongate shape of the locating apertures allows the torque plate 110 to move relative to the bolt 124, so that the vertical position of the torque plate 110 relative to the first mounting plates 62, 64 can be adjusted as the second mounting plate 66 is moved. Adjusting the vertical position of the torque plate 110 in turn adjusts the vertical position of the slots 112, so that the nuts 90 remain in position relative to the torque plate 110 even as the second mounting plate 66 is adjusted. Once the second mounting plate 66 reaches a desired location relative to the first mounting plates 62, 64, the bolts 88 can be tightened. Because the nuts 90 remain positioned within the hexagonal and elongate slots 112 in the torque plate, the nuts 90 are prevented from rotating. Accordingly, rotation of the bolts 88 will thread the bolts 88 into the nuts 90 to increase the engagement between the first mounting plates 62, 64 and the second mounting plate 66. The bolts 88 can then be tightened until a secure coupling is formed. To decouple or loosen the second mounting plate 66 for adjustment, the bolts 88 can be rotated in an opposite (e.g., counter-clockwise) direction. As depicted in FIG. 8, the bottom locating aperture 120 may be formed as a concave recess to maximize the amount of permissible vertical adjustment of the torque plate 110 relative to the first mounting plates 62, 64.

Using the adjustable mounting assembly 60 and waste container tipping device 40 described herein, a refuse truck 10 can be readily customized to deal with a variety of different waste receptacles in a way that reduces manual labor needed to empty the waste receptacles. The adjustable nature of the waste container tipping device 40 permits fast assembly and disassembly, which can help promote serviceability and maintenance to the waste container tipping device 40. Although shown and described in the context of a rear-loading refuse vehicle, the adjustable mounting assembly 60 and waste container tipping device 40 can also be used on front loading or side-loading refuse vehicles. Similarly, the adjustable mounting assembly 60 can be used to adjustably mount a variety of different equipment in customized locations relative to the truck to better help workers perform tasks.

Figure 9:
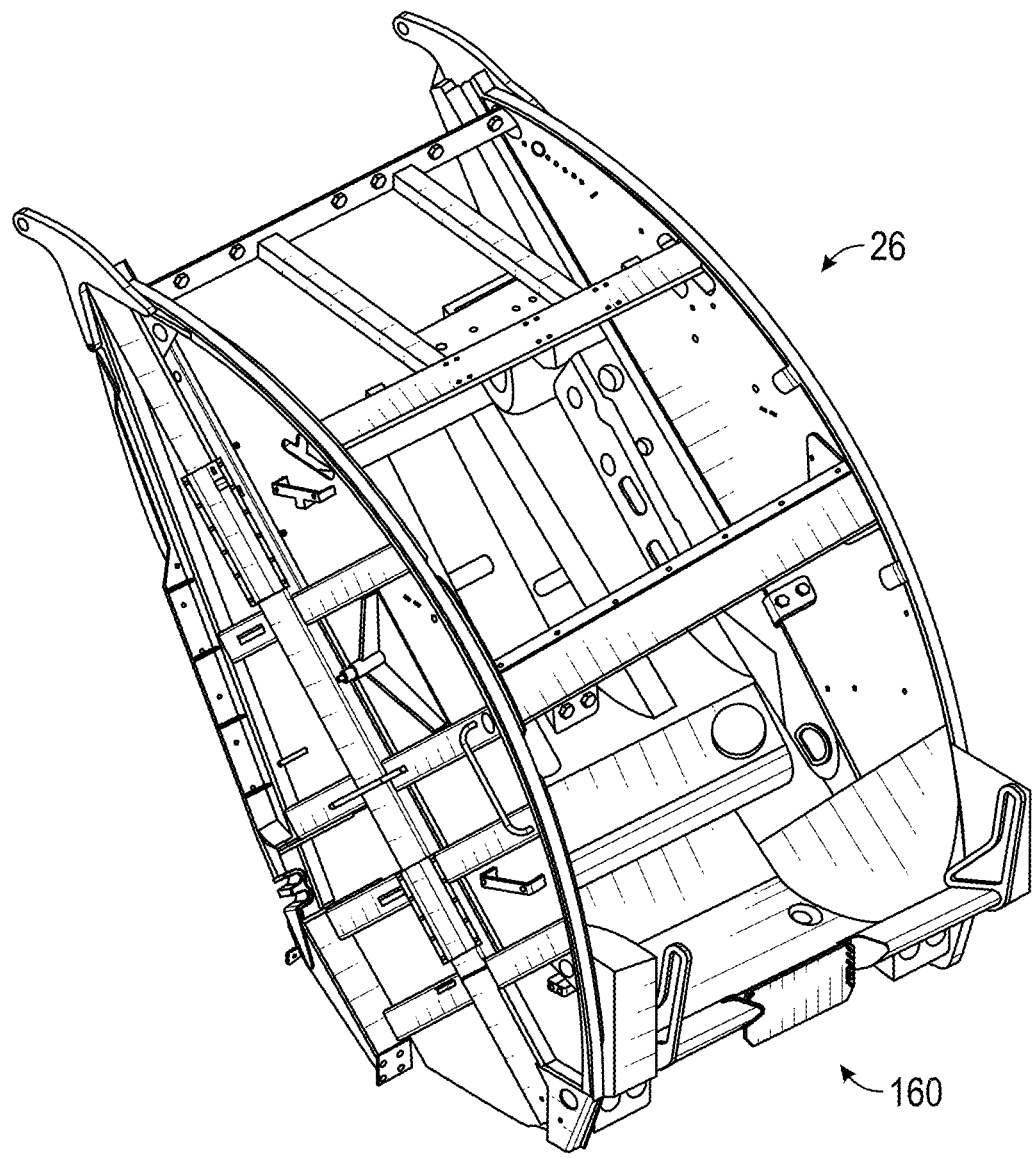
FIG. 9 is a perspective view of a tailgate that can be included on the refuse vehicle of FIG. 1, according to another exemplary embodiment.
Figure 10:
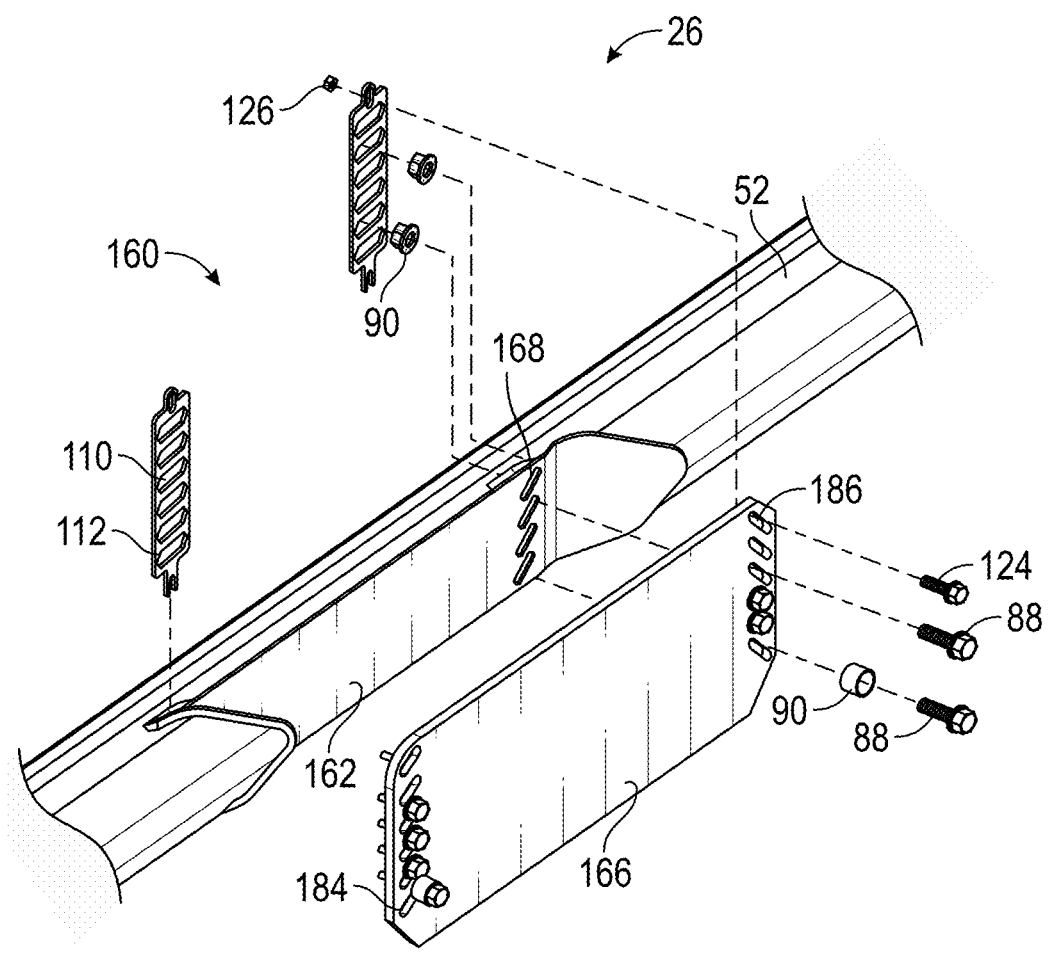
FIG. 10 is a partially exploded view of another mounting plate assembly that can be used to support the tipping device of FIG. 4.

Various modifications to the waste container tipping device 40 and adjustable mounting assembly 60 can be made using the above-described principles. For example, and as depicted in FIGS. 9-10, an alternative mounting assembly 160 is provided. The mounting assembly 160 is recessed within the rear fender 52 of the tailgate 26. The mounting assembly 160 includes a singular first mounting plate 162 that extends along the entire recess within the fender 52. The first mounting plate 162 includes two sets of slots formed on each side of the mounting plate 162, with a first set of slots shown as slots 168 and a second set of slots on the other side of the mounting plate 162, behind the protrusion of the rear fender 52. The slots (e.g., slots 168 and the second set of slots) extend vertically and upwardly away from the outer perimeter of the mounting plate to operate similarly to the slots 68, 70 described above. A second mounting plate 166 is configured to interact with and move relative to the first mounting plate 162. The second mounting plate 166 includes opposing elliptically-shaped slots 184, 186. As described above, the elliptically-shaped slots (e.g., 168, the second set of slots, 184 and 186) allow the two mounting plates 162, 166 to move relative to one another to adjust a relative position of the mounting plate 166 relative to the mounting plate 162 and, accordingly, the fender 52. The two torque plates 110 again provide a series of slots 112 that position and support the nuts 90 in uniformly spaced positions relative to the first mounting plate 162 that help to position and secure the first mounting plate 162 to the second mounting plate 166 by tightening the bolts 88.

Figure 11:
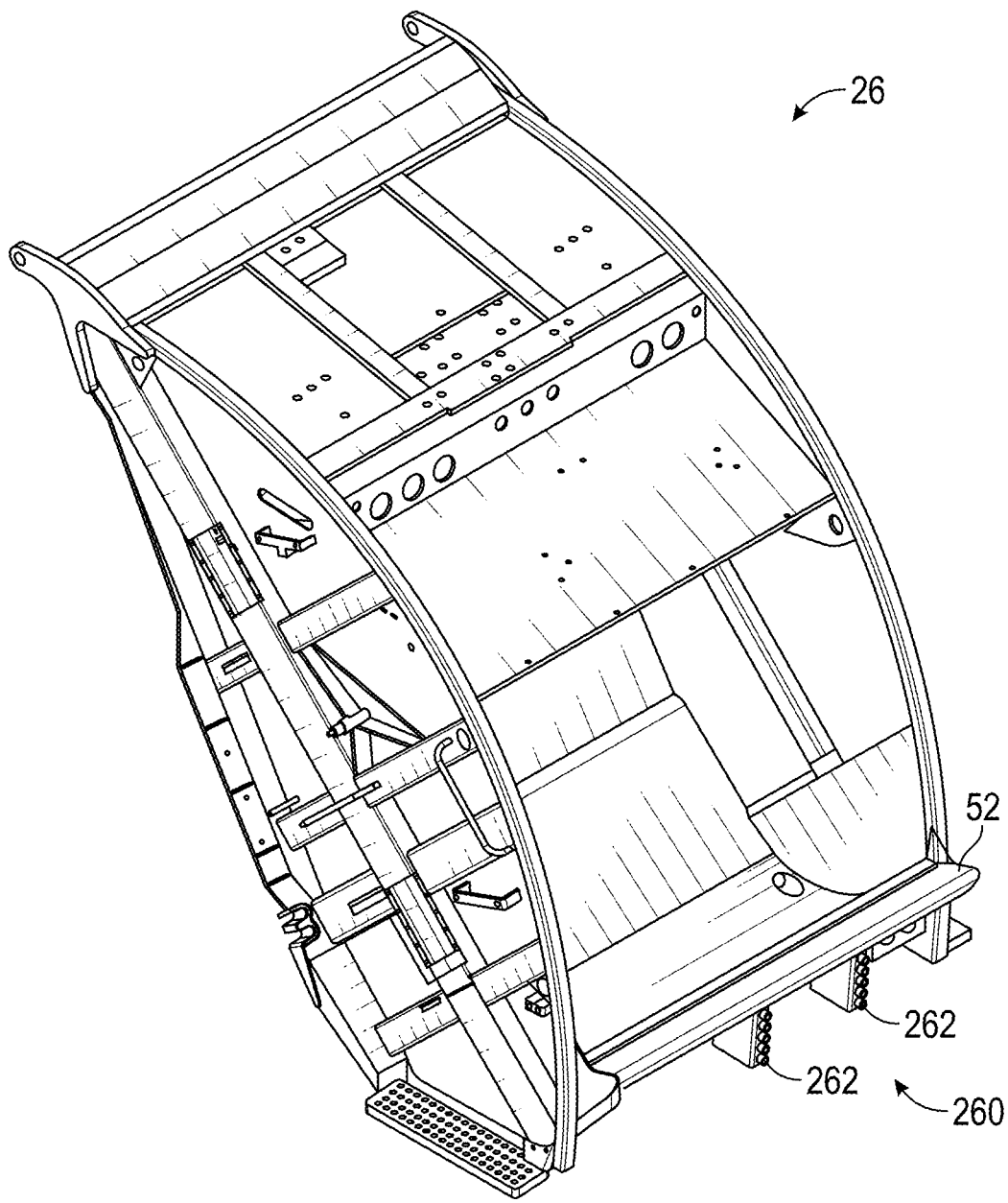
FIG. 11 is a perspective view of another tailgate that can be included on the refuse vehicle of FIG. 1, according to another exemplary embodiment.

FIGS. 11-13 depict additional implementations of the present disclosure. For example, adjustable mounting assemblies 260, 360 can be incorporated in a location where the mounting plates 262, 362 extend flush with the rear fender 52 of the tailgate 26. The mounting plates 262, 362 can be positioned approximately centered within the rear tailgate 26 (as shown in FIG. 11-12) or positioned offset to the curb side of the rear tailgate 26 (as shown in FIG. 13). The mounting plates 262, 362 can be arranged to receive a second mounting plate 66, 166, as shown above. The mounting plates 262, 362 again include elongate slots that allow positional adjustment of the second mounting plate 66, 166 relative to the mounting plates 262, 362. Torque plates 110 with nuts 90 and bolts 88 can once again be used to help secure the second mounting plates 66, 166 to the mounting plates 262, 362 in an adjustable fashion, which can move the rear tipping device 40 on the mounting plates 66, 166 relative to the tailgate 26. Although consistently described as supporting a rear tipping device, various other equipment can be mounted with the adjustable mounting assemblies 60, 160, 260, 360 described herein. For example, a wash-out pump assembly, different lifting mechanisms, and other accessories can be mounted to the refuse truck 10 using the adjustable mounting assemblies 60, 160, 260, 360.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the adjustable tipping device as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse container tipping device comprising:
    a first mounting plate defining a plurality of first slots, the plurality of first slots each extending in a first direction along substantially parallel axes;
    a second mounting plate releasably coupled to the first mounting plate and defining a plurality of second slots, the plurality of second slots each extending in a second direction along substantially parallel axes, the first direction being perpendicular to the second direction;
    a hinge plate coupled to the second mounting plate, the hinge plate supporting a hinge and a grapple arm rotatably coupled to the hinge; and
    a plurality of fasteners coupling the second mounting plate to the first mounting plate, the plurality of fasteners including a bolt and a nut, the bolt extending into and through one of the plurality of first slots and one of the plurality of second slots, and the nut received on the bolt to selectively engage the second mounting plate onto the first mounting plate.

2. The refuse container tipping device of claim 1, wherein the first direction extends both vertically and horizontally such that each of the plurality of first slots extend diagonally along the first mounting plate.

3. The refuse container tipping device of claim 2, wherein the second direction extends both vertically and horizontally such that each of the plurality of second slots extend diagonally along the second mounting plate.

4. The refuse container tipping device of claim 1, wherein the first mounting plate is rigidly coupled to a rear fender of a refuse vehicle.

5. The refuse container tipping device of claim 4, wherein the first mounting plate is defined by a mounting face and a flange extending perpendicularly away from the mounting face, wherein the plurality of first slots are formed through the mounting face.

6. The refuse container tipping device of claim 1, wherein each of the plurality of first slots and each of the plurality of second slots are defined by an elliptical shape.

7. The refuse container tipping device of claim 1, wherein the hinge plate is welded to the second mounting plate.

8. The refuse container tipping device of claim 1, further comprising a torque plate adjustably coupled to the first mounting plate, the torque plate removably receiving the nut within a hexagonal slot and configured to facilitate coupling with the bolt by inhibiting rotation of the nut.

9. A refuse container tipping device comprising:
a hinge plate rotatably supporting a grapple arm; and
a mounting plate assembly coupled to the hinge plate and including a pair of first mounting plates, the pair of first mounting plates defining:
    a first mounting plate including at least a plurality of first slots, the plurality of first slots each extending in a first direction along substantially parallel axes and defining a plurality of first non-intersecting paths for slidable motion to adjust the hinge plate relative to the first mounting plate using a first plurality of fasteners that each extend through one of the plurality of first slots; and
    a second mounting plate including at least a plurality of second slots, the plurality of second slots each extending in a second direction along substantially parallel axes and defining a plurality of second non-intersecting paths for slidable motion to adjust the hinge plate relative to the second mounting plate using a second plurality of fasteners that each extend through one of the plurality of second slots,
wherein the plurality of first non-intersecting paths defined by the plurality of first slots in the first mounting plate are perpendicular to the plurality of second non-intersecting paths defined by the plurality of second slots in the second mounting plate.

10. The refuse container tipping device of claim 9, wherein the hinge plate is coupled to a third mounting plate, the third mounting plate defining a plurality of third slots, wherein each of the fasteners extend through one of the plurality of third slots to couple the hinge plate to the pair of first mounting plates.

11. The refuse container tipping device of claim 10, wherein the plurality of first slots and the plurality of second slots are each defined by an elliptical shape.

12. The refuse container tipping device of claim 11, wherein the plurality of fasteners each include a bolt and a nut.

13. A refuse vehicle comprising:
a chassis supporting a plurality of wheels;
a vehicle body supported by the chassis and defining a receptacle for storing refuse therein;
a tailgate positioned at a rear end of the vehicle body and coupled to the receptacle; and
a refuse container tipping device coupled to the tailgate and comprising:
    a hinge plate rotatably supporting a grapple arm;
    a mounting plate assembly including a pair of first mounting plates, the pair of first mounting plates defining:
        a first mounting plate including at least a plurality of first slots, the plurality of first slots each extending in a first direction along substantially parallel axes and defining a plurality of first non-intersecting paths for slidable motion to adjust the hinge plate relative to the first mounting plate using a first plurality of fasteners that each extend through one of the plurality of first slots; and
        a second mounting plate including at least a plurality of second slots, the plurality of second slots each extending in a second direction along substantially parallel axes and defining a plurality of second non-intersecting paths for slidable motion to adjust the hinge plate relative to the second mounting plate using a second plurality of fasteners that each extend through one of the plurality of second slots,
    wherein the plurality of first non-intersecting paths defined by the plurality of first slots in the first mounting plate are perpendicular to the plurality of second non-intersecting paths defined by the plurality of second slots in the second mounting plate.

14. The refuse vehicle of claim 13, wherein the grapple arm is rotatable relative to the hinge plate by at least ninety degrees.

15. The refuse vehicle of claim 13, wherein the hinge plate is coupled to a third mounting plate, the third mounting plate defining a plurality of third slots, wherein each of the fasteners extend through one of the plurality of third slots to couple the hinge plate to the pair of first mounting plates.

16. The refuse vehicle of claim 15, wherein the plurality of first slots and the plurality of second slots are each defined by an elliptical shape.

17. The refuse vehicle of claim 16, wherein the plurality of fasteners each include a bolt and a nut.

18. The refuse vehicle of claim 13, further comprising a torque plate adjustably coupled to at least one of the pair of first mounting plates, the torque plate removably receiving nuts and configured to facilitate coupling with the fasteners by inhibiting rotation of the nuts.

* * * * *